United States Patent [19]

Pata

[11] Patent Number: 5,034,077
[45] Date of Patent: Jul. 23, 1991

[54] METHOD FOR THERMOFORMING AND BONDING A PAINT-COATED POLYMERIC FILM TO A SUBSTRATE

[76] Inventor: Jack Pata, c/o Eastman Kodak Co., Rochester, N.Y. 14650

[21] Appl. No.: 402,398

[22] Filed: Sep. 5, 1989

[51] Int. Cl.$^5$ .................. B29C 51/10; B29C 51/14; B29C 51/42

[52] U.S. Cl. .................. 156/84; 264/230; 264/342 R; 264/345; 264/510; 264/DIG. 65; 264/DIG. 71; 156/285; 425/384; 425/388; 427/140

[58] Field of Search ............ 264/510, 235, 511, 255.6, 264/342 R, DIG. 65, DIG. 71, 342 RE, 345, 235.8, 346, 230; 156/212, 285, 322, 84; 425/384, 388; 427/140

[56] References Cited

U.S. PATENT DOCUMENTS

| 3,551,232 | 12/1970 | Thompson | 156/87 |
|---|---|---|---|
| 3,674,626 | 7/1972 | Mergy | 264/510 |
| 4,306,856 | 12/1981 | Arippol | 264/DIG. 65 |
| 4,364,885 | 12/1982 | Kanai et al. | 264/235.6 |
| 4,415,523 | 11/1983 | Barham et al. | 264/235 |
| 4,471,018 | 9/1984 | Kritchevsky et al. | 156/245 |
| 4,769,100 | 9/1988 | Short et al. | 156/285 |
| 4,818,589 | 4/1989 | Johnson et al. | 428/201 |
| 4,824,506 | 4/1989 | Hoerner et al. | 156/245 |
| 4,828,637 | 5/1989 | Mentzer et al. | 156/212 |
| 4,838,973 | 6/1989 | Mehtzer et al. | 156/212 |

FOREIGN PATENT DOCUMENTS

| 0285071 | 10/1988 | European Pat. Off. . | |
| 3103584 | 8/1982 | Fed. Rep. of Germany . | |
| 57-070610 | 5/1982 | Japan | 156/285 |

Primary Examiner—Jan H. Silbaugh
Assistant Examiner—Catherine Timm

[57] ABSTRACT

Paint-coated polymeric films which are bonded to substrates such as automobile panels, as a substitute for spray painted finishes, often develop surface blemishes or defects from the coating or web handling operations. These can be reduced or eliminated by vacuum thermoforming the film to the desired substrate in a plural stage procedure. The periphery of the film is clamped in a frame. Then the film is preheated to a temperature above its glass transition temperature until the film becomes taut in the frame. It is allowed to cool and is then reheated to at least the glass transition temperature and is then vacuum thermoformed to the substrate. This procedure eliminates many if not all of the visible surface defects in the thermoformed film.

6 Claims, 1 Drawing Sheet

TO VACUUM PUMP

METHOD FOR THERMOFORMING AND BONDING A PAINT-COATED POLYMERIC FILM TO A SUBSTRATE

FIELD OF THE INVENTION

This invention relates to thermoforming method and, more particularly, to a method for vacuum thermoforming and bonding an adhesive polymeric film to a substrate.

BACKGROUND OF THE INVENTION

As an improvement over the spray painting of articles such as automobile bodies, boats and household appliances, a new kind of paint-coated sheet material or film has been developed to provide protective and decorative finishes. The new material comprises a flexible, stretchable, thermoplastic support sheet, also known as a carrier film, which has a protective and decorative paint layer, also called a basecoat, of uniform thickness and appearance on one side and, optionally, an adhesive layer on the other side. It can also have other layers such as a tie or bonding layer between the paint layer and the carrier film. In a preferred embodiment a transparent topcoat, also called a clearcoat, covers the paint layer. This combination provides an attractive basecoat-clearcoat or clear-over-color appearance which in recent years has become popular for spray-coated finishes.

Using known thermoforming procedures such as vacuum forming and in-mold bonding, preferred types of the paint-coated sheet material can be stretched and bonded to an article such as an automobile body panel to provide a basecoat-clearcoat finish. Advantages over obtaining such finishes by spray painting include economy in the use of paint and improved control of evaporating solvents, which reduces air pollution. Furthermore, the new material has a remarkably smoother and more attractive appearance than spray painted finishes.

The new type of thermoformable sheet material and a process for its manufacture are described in the G. G. Reafler, U.S. patent application Ser. No. 116,426, filed Nov. 3, 1987. The process involves applying the paint composition to the surface of the thermoplastic carrier film by laminar flow coating, followed by drying and then coating and drying each additional layer in sequence to obtain a paint-coated film of excellent gloss and smoothness.

In the Reafler sheet materials, the carrier film has heat-softening and tensile elongation properties which adapt it to use in thermoforming. The various layers have compatible heat-softening and tensile elongation properties. As a result, the sheet material can undergo substantial elongation during thermoforming without crazing or delamination of the layers.

In use, the paint-coated film is stretched and bonded by thermoforming to a substrate such as a three-dimensional automobile panel. The procedure of thermoforming can be substantially as described in the patent to Short et al, U.S. Pat. No. 4,769,100 wherein the film is heated and then drawn by vacuum into bonding contact with the substrate.

Notwithstanding its excellent thermoforming capability, areas of this high quality sheet material can become non-uniform or flawed by the introduction of visible defects during manufacture or storage of the film.

As in the large-scale manufacture of any product required to meet stringent quality standards, it is inevitable that during the production of a paint-coated film which is expected to provide a consistently uniform finish on the exterior of an automobile and the like, defective portions of production runs have to be discarded as a quality control measure.

It is of course time consuming as well as economically wasteful to detect and discard such flawed portions. By flawed portions we mean sections of film which have coating patterns, streaks, blemishes or other visible defects formed during the coating operation or that may have developed during storage or handling of the finished film.

And more so than in the manufacture of materials that remain physically unchanged during their intended use, in paint-coated films which are heated and stretched during their bonding to intricate three-dimensional parts, any flow tends to become magnified in proportion to the degree of stretch and is therefore seriously objectionable.

The present invention provides a surprisingly simple method for curing such flaws and thereby obviates the need for the time consuming and economically wasteful detection and discarding of defective portions of the film. No new equipment is required. Nor is it necessary to modify or expand existing equipment.

BRIEF SUMMARY OF THE INVENTION

The method of the invention comprises:

clamping in a frame the periphery of a thermoformable polymeric film which has an adhesive side and a non-adhesive side;

pre-heating the film to a temperature at which it becomes taut within the frame;

allowing the film to cool;

re-heating the film to at least its glass transition temperature (Tg);

placing a substrate in an open thermoforming chamber in close proximity to the adhesive side of the clamped film;

hermetically sealing the opening of the chamber with the adhesive side of the film;

lowering the pressure in the sealed chamber and thereby forcing the film into bonding contact with the substrate.

THE DRAWINGS

The invention will be described with reference to the drawings, of which:

DETAILED DESCRIPTION

Figure 1:
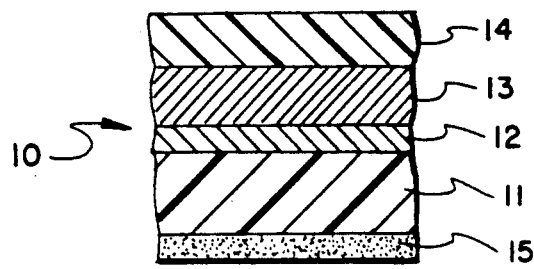
FIG. 1 is an enlarged diagrammatic cross-section of a sheet material used in the invention.

An example of a thermoformable paint-coated film 10 is illustrated schematically in FIG. 1 in cross-section, but not to scale. A flexible polymeric carrier film 11 is coated by means of an extrusion coating hopper such as disclosed in Beguin, U.S. Pat. No. 2,681,294 with an aqueous polyurethane pigmented paint composition such as disclosed in the patent to Porter, U.S. Pat. No.

4,719,132 to form the paint layer 13. The carrier film can be formed by the extrusion of a polyester blend such as disclosed by the patent to Weemes, U.S. Pat. No. 4,582,876. The thickness of the carrier film 11 can be in the range, for example, of about 0.05 to 0.5 mm and that of the paint layer 13 in the range from about 0.012 to 0.08 mm. Optionally, a thin tie-coat or primer layer 12 can be coated on the carrier film before the paint layer is applied. Over the paint layer preferably is coated a clear polyurethane layer 14, preferably using a two-component, polyol/isocyanate composition such as disclosed in Example 0 of the Porter patent, supra. The thickness of this clearcoat can be in the range, for example, from about 0.05 to 0.25 mm and in view of its thickness, it can be coated in two or more passes to facilitate drying.

On the other side of the carrier film is coated a pressure-sensitive adhesive layer 15. This can be any of a member of known compositions, a preferred composition being the aqueous acrylic adhesive, SHRINK WRAP ADHESIVE HC7803-VAC, supplied by PPG Industries, Inc. The adhesive layer thickness can be in the range, for example, from about 0.04 to 0.12 mm. Optionally, the adhesive layer is covered by a protective release sheet (not shown) which is stripped away before thermoforming the film to a substrate.

Figure 2A:
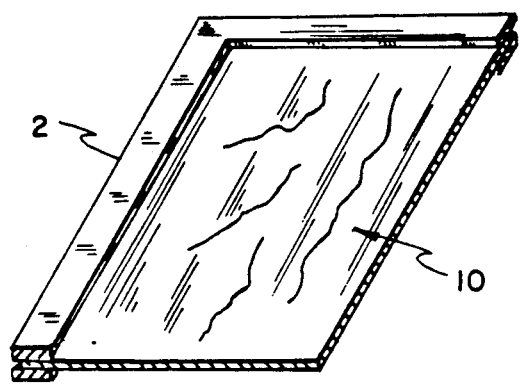
FIG. 2A and 2B are perspective views of a clamped defective film before and after preheating.
Figure 2B:
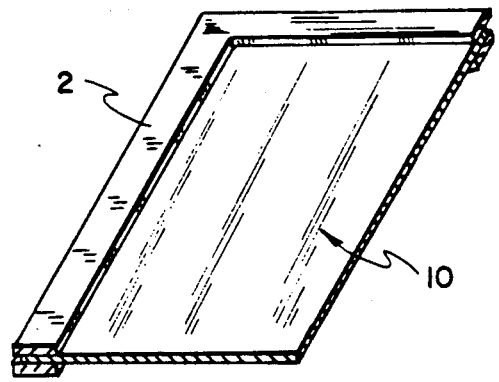

FIGS. 2A and 2B are diagrammatic views in perspective of the appearance of a peripherally clamped defective film before and after preheating. Flaws depicted by erratic lines in FIG. 2A have been cured by the preheating step, as shown by their absence in FIG. 2B.

Figure 3:
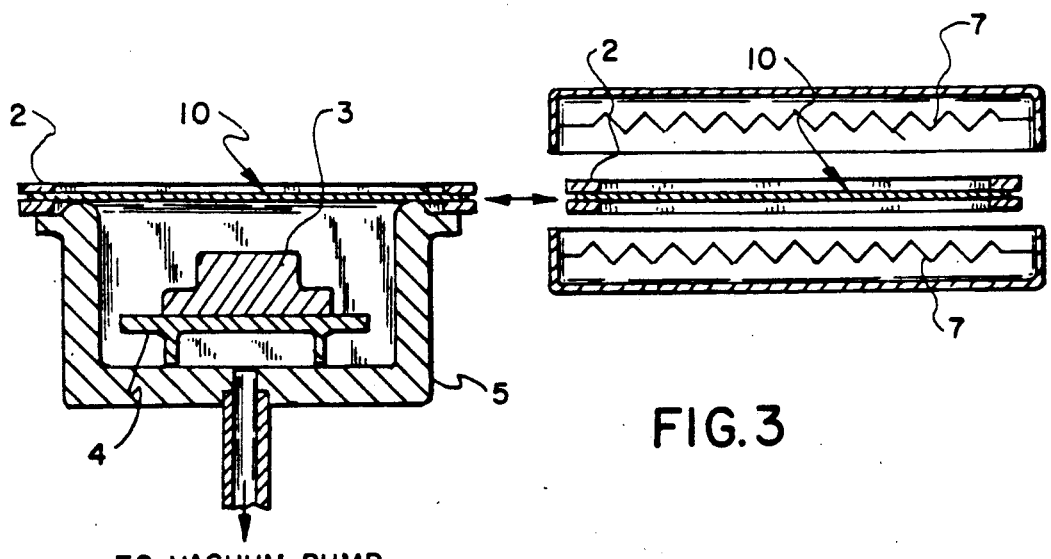
FIG. 3 is a diagrammatic view in prespective of a portion of an apparatus in which the method of the invention can be carried out.

The vacuum thermoforming apparatus shown in FIG. 3 comprises a heater 7 for preheating and reheating the flexible polymeric film 10 held peripherally in clamp 2. The reheated film is moved as shown into hermetically sealing adhesive contact with the opening of a thermoforming chamber 5 containing substrate 3 resting on platen 4. By lowering the pressure in the sealed chamber the film is forced into bonding contact with the substrate. The bonded film is then allowed to cool before, during and/or after removal of the finished product from the chamber. Alternatively, one or both of the heating steps can occur while the clamped film is positioned above the thermoforming chamber.

Figure 4:
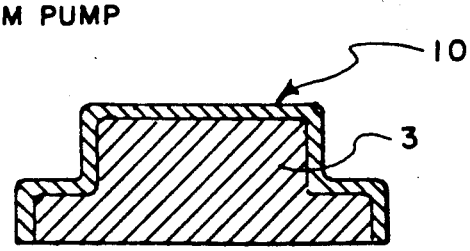
FIG. 4 is a view of a cross-section of a substrate having a sheet material bonded thereto.

FIG. 4 is a cross-sectional view of the finished product comprising substrate 3 having bonded thereto the paint-coated film 10.

Although the Reafler sheet material is the preferred film for use in the thermoforming method of the invention, the new method can also use other paint-coated films, several of which have been reported in recent patents and literature. See, for example, Short et al, U.S. Pat. No. 4,769,100; published European Patent Application 0230364; published July 29, 1987; and SAE Technical Paper Series 890352, presented Feb. 27-Mar. 6, 1989, all of which are said to be useful in vacuum thermoforming. Other paint-coated films said to be useful in the "in-mold" thermoforming technique and/or vacuum forming are disclosed in the patent to Ellison et al, U.S. Pat. No. 4,810,540; European Patent Application 285,071, published Oct. 5, 1988; and Research Disclosure, No. 24303, published July 1984. All of these paint-coated films are examples of films believed to be useful, to a greater or lesser degree, in the applicants present thermoforming method.

The invention is further illustrated by the following examples:

EXAMPLE 1 (Comparison)

A carrier film was prepared from a blend of a copolyester resin and a thermoplastic rubber-modified vinyl aromatic polymer composition described in U.S. Pat. No. 4,582,876 as follows:

A mixture of 55:45 parts by weight of the polyester resin and Dylark ® Styrene Copolymer 600 was compounded by extrusion. The polyester was derived from terephthalic acid, 19 mole % ethylene glycol and 81 mole % 1,4-cyclohexanedimethanol. Dylark ® Styrene Copolymer 600 is a rubber modified styrene-maleic anhydride copolymer available from ARCO Chemical Company, a division of Atlantic Richfield Company.

The blend was heated to 260°-290° C. and extruded through a die into a nip comprising two temperature-controlled chrome plated stainless steel rollers. The extruded web was then cooled on a chill roller. The thermoplastic film had a mean thickness of about 0.20 mm and a glass transition temperature (Tg) of 93° C.

The carrier film prepared as described was coated with a thin layer of aqueous tie-coat composition as described in Table I. After drying, the thickness of the tie-layer was approximately 0.0005 mm.

TABLE I

Tie Coat Composition

| Ingredients | Approx. % Wt. |
| --- | --- |
| Ethylene Glycol Monohexyl Ether | <1 |
| Deionized Water | 75 |
| N,N-Dimethyl Ethanolamine | <1 |
| N-Methylpyrrolidone | 1 |
| Diethylene glycol Monobutyl Ether | 1 |
| Acrylic Resin* | 10 |
| Urethane Resin** | 10 |
| diluted with water to a total solids content of 3.0% by weight. | |
| "Fluorad FC 170C" Surfactant, sold by 3M Company | ~0.05 |

*Styrene butyl acrylate butyl methacrylate terpolymer
**Reaction product of methylene dicyclohexyl diisocyanate and an aliphatic diol The paint composition described below was metered from a nitrogen gas pressurized vessel through a coating hopper extrusion slot having a width of 0.25 millimeter onto the carrier film moving at a speed of 8 m/min. The coating roll was cooled with recirculating water to reduce the propensity of the coating to streak and to minimize precipitate formation on the hopper lip. The coating method and apparatus were substantially as described in U.S. Pat. No. 2,681,294 and included means for maintaining a pressure differential across opposite surfaces of the coating ribbon. The coating was dried at 27°-80° C. (dry coverage 43 g/m² and 0.6 mm thickness) in a plural-stage, continuous flat bed drying apparatus supplied with low velocity, warm air streams.

| Paint Composition | |
| --- | --- |
| Ingredient | Approx. % Weight |
| Titanium Dioxide | 25 |
| Ethylene Glycol Monohexyl Ether | 5 |
| Diethylene Glycol Monobutyl Ether | 1 |
| Deionized Water | 45 |
| N,N-Dimethyl Ethanolamine | 1 |
| N-Methylpyrrolidone | 5 |
| Urethane Resin | 20 |

The dried, paint-coated web was wound on a take-up roll and again drawn through a coating station to form over the paint layer a uniform layer of a clear topcoat of the composition described below.

| Clear Topcoat Composition | |
|---|---|
| Ingredient | Approx. % Weight |
| A Urethane Resin | 60 |
| Toluene | 40 |
| Benzotriazole | 1 |
| diluted to 51% solids with acetone | |
| B* Polyfunctional aliphatic isocyanurate resin based on 1,6-hexamethylene diisocyanate | 100 |

*Available as Desmodur N-3300 from Mobay Corporation Coatings Division

Components A and B were mixed by means of an in-line mixer before reaching the coating hopper as described in the Hayward et al U.S. patent application Ser. No. 189,090, filed may 2, 1988. The composition flowed from the mixer directly to an extrusion coating hopper of the type disclosed in U.S. Pat. No. 2,681,294 and was extrusion coated, in a single pass, through the narrow extrusion slot of the hopper. The web having on its surface the wet topcoat layer was then passed directly to a drying chamber where the topcoat layer was dried and cured by exposure to low velocity streams of warm, moderately humid air in a series of stages of successively increasing temperatures, the drying and curing procedure being substantially as disclosed in the Fronheiser et al U.S. patent application Ser. No. 166,083, filed Mar. 9, 1988. The dried clear topcoat layer had a thickness of about 0.06 mm.

The dried, clear-coated web was wound on a take-up roll, then unwound, and once more drawn through a coating station to form on the backside of the carrier film opposite the tie-layer a thin layer of a pressure-sensitive adhesive which, upon continuous drying to a tacky state, had a thickness of about 0.07 mm. The adhesive was a clear, aqueous acrylic adhesive comprised of 50 weight percent water and 50 weight percent acrylic resin. It is supplied as "Shrink Wrap Adhesive HC7803-VAC" by PPG Industries, Inc. of Pittsburgh, PA.

A thin polyester film having a thickness of about 0.04 mm was applied to the backside adhesive layer as a temporary protective release sheet to permit handling of the sheet material prior to its use.

The resulting laminated sheet material, referred to hereinafter as "the first composite," had flawless surface characteristics. It was subsequently bonded to a substrate by the conventional procedure as follows:

After removal of the release sheet, a sample of the first composite was drawn by vacuum thermoforming into contact with an inclined metal test panel and adhesively bonded to the panel. The sample was heated by infrared heating elements to 135° C. before initiating the vacuum drawdown. (The film temperatures in this and the following examples were read with a pyrometer). As it was drawn onto the inclined test panel, the sample stretched an amount proportional to the distance along the panel, the area at the top of the panel having little or no stretch and the area at the bottom having the maximum stretch of about 200 percent.

The finished product consisting of the substrate having the paint-coated film bonded thereto had an excellent smooth surface appearance, including good gloss and distinctness of image in unstretched as well as stretched areas.

EXAMPLE 2 (Comparison)

A second sheet material made as described in Example 1 was flawed due to the presence in some areas of coating streaks and of a wavy pattern which were introduced presumably during the coating of the paint layer. A first sample of a flawed area of the sheet material, referred to hereinafter as "the second composite," was bonded to a substrate by the conventional precedure described in Example 1.

The finished product had a non-uniform surface appearance because the coating flaws had been retained throughout the thermoforming operation.

Furthermore, while the initially present defects had remained essentially unchanged in unstretched areas, their shape and configuration had been accentuated in proportion to the degree of stretching of the film. Defects in the form of markings running lateral to the direction of stretch were noticeably widened.

EXAMPLE 3 (Invention)

A second sample of the flawed section of the sheet material of Example 2 was bonded to a substrate by the procedure according to this invention which differed from the conventional procedure described in Examples 1 and 2 by preheating and cooling the film prior to the application of the thermoforming heat.

Specifically, the bonding procedure was as follows:
The paint-coated film was
1. clamped peripherally in a frame;
2. preheated to a temperature of about 150° C., at which it becomes taut within the frame;
3. allowed to cool for 1.5 minutes to about 38° C. without losing its tautness; (in this stage, the clamped film was preheated successively in three steps in order to be able to determine the point at which it had reached its desired tautness. In the first step, the film was heated for three seconds to a temperature of about 83° C., removed from the heater for visual inspection, and then re-inserted into the heater. In the second step, the film was heated for three seconds to a temperature of about 120° C., removed from the heater for visual inspection and then re-inserted into the heater. In the third step, the film was heated for three seconds to a temperature of about 150° C. and removed from the heater for visual inspection);
4. reheated for about 3 seconds to its glass transition temperature of 93° C.;
5. placed over the opening of the thermoforming chamber containing the substrates to adhesively seal the chamber;
6. forced into bonding contact with the substrate by lowering the pressure in the sealed chamber; and
7. allowed to cool to about 75° C.

The objectionable flaws described in Example 2 had been eliminated, and the quality of the finished product matched that of Example 1.

EXAMPLE 4 (Invention)

Similarly good results were obtained when the precedure described in Example 3 was repeated with an initially flawed film sample to which the release sheet remained attached during the preheating step. The release sheet was peeled off the adhesive surface of the film prior to the application of the thermoforming heat.

EXAMPLE 5 (Comparison)

The coating defects were not eliminated when a sample of a flawed portion of the film of Example 2 was preheated in an oven to a temperature of about 150° while not clamped in a frame.

The invention has been described in detail with particular reference to preferred embodiments thereof, but it will be understood that variations and modifications can be effected within the spirit and scope of the invention.

I claim:

1. A method for thermoforming and bonding a thermoformable paint-coated polymeric film, the coating being flawed, which has an adhesive side and a non-adhesive side to a substrate which comprises:

clamping the periphery of the film having the flawed coating in a frame;

preheating the clamped film to a temperature above its glass transitions temperature until it becomes taut within the frame and the coating flaw is reduced or eliminated;

allowing the preheated clamped film to cool to a temperature below its glass transition temperature;

reheating the cooled clamped film to at least its glass transition temperature;

placing a substrate in an open thermoforming chamber in close proximity to the adhesive side of the reheated clamped film;

hermetically sealing the opening of the chamber with the adhesive side of the reheated clamped film;

lowering the pressure in the sealed chamber and thereby forcing the reheated clamped film into bonding contact with the substrate.

2. A method according to claim 1 wherein the paint-coated film comprises a thermoplastic carrier film having on its non-adhesive side a polyurethane paint layer and a polyurethane clearcoat.

3. A method according to claim 1 wherein the paint layer contains light reflective flakes.

4. A method according to claim 1 wherein the adhesive side of the film has coated thereon a layer of pressure-sensitive adhesive.

5. A method according to claim 1 wherein the paint-coated film comprises a carrier film formed from a blend of a copolyester and a thermoplastic rubber-modified vinyl aromatic polymer composition.

6. A method according to claim 1 wherein the preheating of the film to the point of tautness and coating flaw reduction or elimination occurs in intervals of successively higher temperatures.

* * * * *

UNITED STATES PATENT AND TRADEMARK OFFICE
CERTIFICATE OF CORRECTION

PATENT NO. : 5,034,077
DATED : July 23, 1991
INVENTOR(S) : Jack Pata

It is certified that error appears in the above-identified patent and that said Letters Patent is hereby corrected as shown below:

On the title page, Item [73] Assignee: Eastman Kodak Company, Rochester, New York.

Signed and Sealed this

Thirtieth Day of March, 1993

Attest:

STEPHEN G. KUNIN

*Attesting Officer*     *Acting Commissioner of Patents and Trademarks*